United States Patent [19]

McLean

[11] Patent Number: 4,878,283
[45] Date of Patent: Nov. 7, 1989

[54] AUGMENTOR LINER CONSTRUCTION

[75] Inventor: Howard J. McLean, No. Palm Beach, Fla.

[73] Assignee: United Technologies Corporation, Hartford, Conn.

[21] Appl. No.: 91,488

[22] Filed: Aug. 31, 1987

[51] Int. Cl.⁴ .................. B23P 15/16; F02K 3/10
[52] U.S. Cl. .................... 29/163.6; 60/757; 60/261
[58] Field of Search .............. 60/261, 759, 757, 755, 60/752; 29/163.6, 157 C; 72/458, 479

[56] References Cited

U.S. PATENT DOCUMENTS

| 1,047,832 | 12/1912 | Peterson et al. | 72/458 |
| 2,867,267 | 1/1959 | Nerad et al. | 60/755 |
| 2,974,486 | 3/1961 | Edwards | 60/261 |
| 3,190,250 | 6/1965 | Hinden | 72/479 |
| 3,712,062 | 1/1973 | Nash | 60/261 |
| 4,072,008 | 2/1978 | Kenworthy et al. | 60/261 |
| 4,718,230 | 1/1988 | Honeycutt, Jr. et al. | 60/261 |

FOREIGN PATENT DOCUMENTS 2844349  4/1979  Fed. Rep. of Germany ........ 60/757

Primary Examiner—Carlton R. Croyle
Assistant Examiner—D. Stout
Attorney, Agent, or Firm—Norman Friedland

[57] ABSTRACT

The holes in a liner for an augmentor for a gas turbine engine are reoriented so that cooling air admitted into the gas path is directed tangentially to the liner wall instead of radially and the opening defines a scoop that enhances turbulence adjacent the outer diameter of the liner to improve its heat transfer characteristics, and the method of reorienting said holes.

2 Claims, 2 Drawing Sheets

FIG. 2
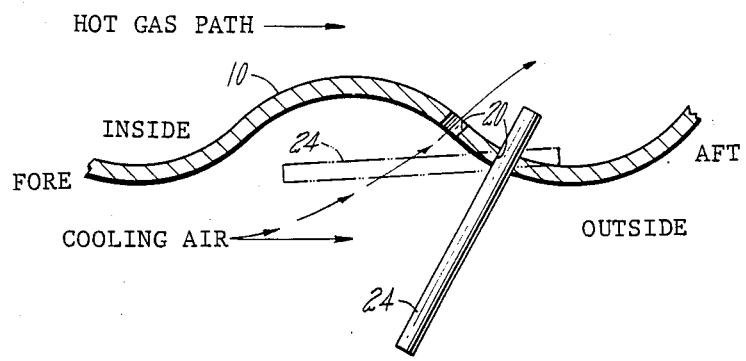
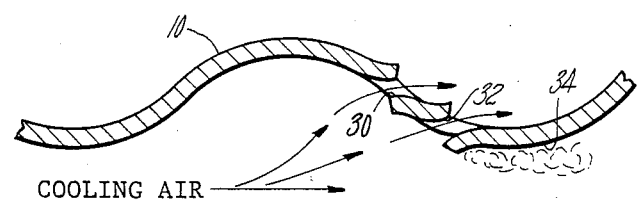
FIG. 3

AUGMENTOR LINER CONSTRUCTION

TECHNICAL FIELD

This invention relates to gas turbine engines and particularly to the construction of the liner disposed adjacent the gas path of the engine.

BACKGROUND ART

Obviously, it is of paramount importance to maintain components of a gas turbine engine, such as engine cases, at tolerable temperature levels. To achieve this end, liners disposed between the casing and the gas path are typically utilized, particularly adjacent the outer casing of the augmentor. The liner is coaxially spaced relative to the casing and generally defines an annular passageway. Cool air is fed into the annular passageway to flow axially in the same direction of the gas path. Certain types of liners are fabricated with a plurality of radially drilled holes or apertures that serve to direct the cooling air radially into the gas path, and this invention pertains to these types of liners.

DISCLOSURE OF INVENTION

It is an object of this invention to provide for a liner of an augmentor improved cooling means.

A still further object of this invention is to provide means for orienting the holes of a liner of a gas turbine engine so that cooling air discharging therefrom is in a discrete manner.

A still further object of this invention is to provide for aircraft an improved augmentor liner that has a plurality of apertures that orient the cooling flow to coalesce a cooling film on the liner and provide a roughened surface to enhance heat transfer.

A still further object of this invention is the method for forming apertures in a liner for an augmentor that orients the flow of cooling air to form a film on the inner surface of the liner.

A still further object of this invention is the method of forming holes in an augmentor liner by preforming from blank stock of sheet metal a flat-like pre-sized member, drilling a pattern of holes into the flat-like element, rolling and forming said flat-like element into generally cylindrically sinusoidaly shaped member and welding the ends, inserting a rod, circular in cross section into said holes used as a tool to be rotated to reorient the axis of said hole from a radial direction to an axial direction so as to flow cooling air tangentially relative to the liner surface.

The foregoing and other features and advantages of the present invention will become more apparent from the following description and accompanying drawings.

BRIEF DESCRIPTION OF THE DRAWINGS

FIG. 2 is a sectional view taken along the line 2—2 of FIG. 1 showing the liner prior to having the apertures reoriented and illustrating a method of reorienting the apertures; and FIG. 3 is the structure shown in FIG. 2 after the apertures are reoriented.

BEST MODE FOR CARRYING OUT THE INVENTION

Figure 1:
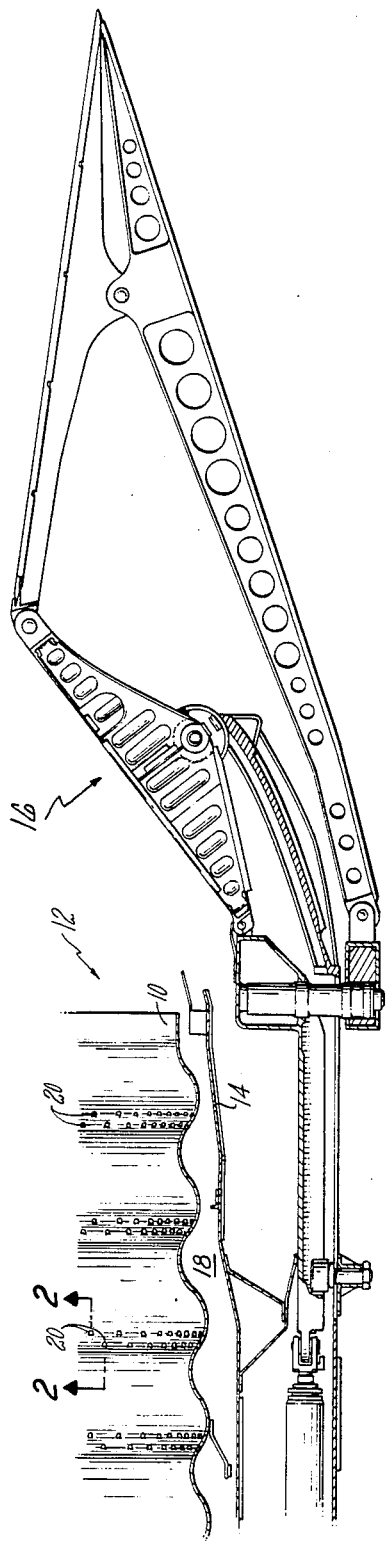
FIG. 1 is a partial sectional view showing the liner mounted adjacent the case of the augmentor of a turbine type power plant.

In its preferred embodiment, the invention is utilized on the liners of an augmentor for a gas turbine engine of the F-100 model manufactured by the Pratt & Whitney Aircraft Group of United Technologies Corporation, the assignee of this application, and to which reference should be made for a more detailed description.

As noted by referring to FIGS. 1 to 3 (inclusive) the liner 10 of augmentor generally illustrated by reference numeral 12 extends axially coextensive with the gas path and is spaced from the outer casing 14, and ends at the nozzle 16. As is apparent from FIG. 1 the liner 10 which is coaxially mounted relative to casing 14 defines therewith an annular flow passage 18 that receives cooling air from a cooler source, say the engine's compressor (not shown), that serves to maintain the temperature of the case within tolerable limits. The liner is provided with a plurality of apertures or drilled holes 20 for passing air from annular passage 18 into the gas path so as to keep the liner sufficiently cool. The flow of cooling air through drilled holes 20 in the liner depend solely on the pressure drop across each particular hole. As noted, the holes are placed in particular convolutes (the valley portion of the liner) and the centerline of the holes of heretofore designed liners are generally radial and substantially perpendicular to the flow of the gas path.

According to this invention these apertures 20 are reoriented so as to direct the flow of cooling air substantially parallel to the adjacent liner wall. This is accomplished by inserting a tool (rod 24) from the outside of the liner through the hole and rotating it from the aft direction to the fore direction for approximately 60°.

This forms a hole with a scoop 30 on the outer diameter to pick up total pressure of the cooliing air and at the same time produce a turbulence generator to enhance the cooling coefficient downstream of the scoop. On the inner diameter of the liner, scoop 32 points downstream and acts as an aspirator to draw cooling air through the hole. It also acts as a deflector to guide hot gas away from the liner just downstream of the scoop. The combination of the two scoops provides a hole possessing directional capability which lays the cooling air film tangentially along the liner rather than radially. The scoops lay a cooling film on the liner and provide a roughened surface 34 to induce turbulence and enhance heat transfer.

Although this invention has been shown and described with respect to detailed embodiments thereof, it will be understood by those skilled in the art that various changes in form and detail thereof may be made without departing from the spirit and scope of the claimed invention.

I claim:

1. The method of forming circular holes in a cylindrically sinusoidally shaped liner for an augmentor for a gas turbine engine that is distorted to orient the center line of the circular holes so that flow passing therethrough from a stream that is generally axial rather than radial comprising the steps of preforming from sheet metal a generally cylindrically sinusoidally shaped member, drilling a pattern of circular holes prior to the step of preforming, inserting a rod-like tool into each of said circular holes and rotating said tool to reorient the direction of said circular hole from a radial to an axial position so that the flow passing through said circular hole is tangential to the wall of said cylindrically sinusoidally shaped member through which said circular hole is made and flows in the same direction as the gas path of the gas turbine engine.

2. The method of claim 2 in which the rod is rotated 60°.

* * * * *